United States Patent [19]
Bare et al.

[11] 3,853,982
[45] Dec. 10, 1974

[54] METHOD FOR RECOVERING VANADIUM-VALUES FROM VANADIUM-BEARING IRON ORES AND IRON ORE CONCENTRATES

[75] Inventors: Conrad B. Bare, Coopersburg; Joseph W. Pasquali, Bethlehem, both of Pa.

[73] Assignee: Bethlehem Steel Corporation, Bethlehem, Pa.

[22] Filed: Nov. 7, 1973

[21] Appl. No.: 413,723

[52] U.S. Cl................. 423/68, 423/138, 423/150, 423/62
[51] Int. Cl............................................. C01g 31/00
[58] Field of Search........... 423/62, 65, 67, 68, 593, 423/138, 150

[56] References Cited
UNITED STATES PATENTS

| | | | |
|---|---|---|---|
| 1,531,541 | 3/1925 | Carpenter............................. | 423/65 |
| 2,168,169 | 8/1939 | Meyer................................... | 423/68 |
| 2,257,978 | 10/1941 | Robertson et al. ................... | 423/67 |
| 2,270,444 | 1/1942 | Jenness................................. | 423/68 |
| 2,357,466 | 9/1944 | Frick..................................... | 423/67 |
| 2,697,650 | 12/1954 | Hixson et al.......................... | 423/58 |
| 3,332,736 | 7/1967 | Shaw et al. ........................... | 423/68 |
| 3,486,842 | 12/1969 | Michal.................................. | 423/68 |

*Primary Examiner*—Herbert T. Carter
*Attorney, Agent, or Firm*—Joseph J. O'Keefe; Charles A. Wilkinson; John S. Simitz

[57] ABSTRACT

Method for extracting vanadium-values from vanadium-bearing iron ores and/or iron ore concentrates including mixing the iron ores and/or iron ore concentrates with a calcium containing material, roasting the mix in an oxidizing atmosphere at a temperature for a time to produce calcium vanadates, comminuting the roasted mix and leaching the comminuted roasted mix in an aqueous solution containing carbonate or bicarbonate compounds to produce vanadates which are readily soluble in the aqueous leaching solution and simultaneously producing substantially insoluble calcium carbonate or calcium bicarbonate which remains as part of the undissolved residue containing iron-values. The vanadate-rich aqueous leaching solution is separated from the undissolved residue containing iron-values and treated by known methods to recover the vanadium-values. The undissolved residue can be processed to recover the iron-values.

32 Claims, No Drawings

METHOD FOR RECOVERING VANADIUM-VALUES FROM VANADIUM-BEARING IRON ORES AND IRON ORE CONCENTRATES

BACKGROUND OF THE INVENTION

This invention is directed to an improved method for roasting and leaching vanadium-bearing iron ores and/or iron ore concentrates whereby the vanadium-values are extracted from the iron ores and/or iron ore concentrates.

Modern practices for removing vanadium-values from vanadium-bearing iron ores and/or iron ore concentrates include roasting a mixture of the iron ores and/or iron ore concentrates and an alkali metal compound, such as sodium carbonate, sodium sulfate, sodium chloride and the like, and, thereafter, leaching the mixture with water to extract soluble sodium vanadates from the roasted iron ores and/or iron ore concentrates.

Usually the iron ores and/or iron ore concentrates are mixed with soda ash and the mixture is balled prior to roasting. The pellets produced in roasting can contain as much as 2.0% soda ($Na_2O$). Leaching the pellets with water extracts sodium vanadates formed during the roasting step. A considerable amount of the alkali, or soda ($Na_2O$), forms insoluble compounds with the gangue constituents present in the ore. As a result, after leaching as much as 1.1% soda ($Na_2O$) can remain in the pellets. This percentage of soda is an excessive amount and the pellets cannot be considered for use in a blast furnace because the soda in the pellets will react with the constituents in the refractory lining in the blast furnace causing premature failure of the refractory lining.

Prior art methods are exemplified in U.S. Pat. NO. 3,486,842 issued Dec. 30, 1969 to Eugene J. Michal entitled "Process for Removing Vanadium from Iron Ores." The process is directed to grinding a vanadium-bearing iron ore, mixing the ground ore with a sodium or potassium compound such as sodium carbonate and the like, forming the mix into nodules or pellets, heating the pellets in an oxidizing atmosphere to 700°–1950° F., raising the temperature to 2200°–2450° F. and further heat treating the pellets to harden the pellets and to form water soluble alkali metal vanadates. The pellets are leached in water to extract the alkali metal vanadates which dissolve in the water. The vanadate-rich water is separated from the pellets and vanadium-values are recovered by known methods.

Unfortunately, as previously noted above, the described process does not remove all the alkali from the pellets. As a result, the pellets are not usable in the blast furnace to recover the iron-values therein, since the alkali reacts with constituents in the refractory lining in the blast furnace causing premature failure thereof.

It is the object of this invention to provide an improved method for extracting vanadium-values from vanadium-bearing iron ores and/or iron ore concentrates, which method does not introduce objectionable amounts of alkali into the iron ores and/or iron ore concentrates.

It is another object of this invention to provide a method for extracting vanadium-values from vanadium-bearing iron ores and/or iron ore concentrates wherein the iron ores and/or iron ore concentrates are mixed with a calcium containing material. The mix is roasted in an atmosphere containing oxygen. The roasted mix is ground and then leached in an aqueous solution containing carbonate or bicarbonate compounds to extract vanadium-values as vanadates which are readily soluble in the aqueous leaching solution and simultaneously produce substantially insoluble calcium carbonate or calcium bicarbonate which remains with the undissolved residue containing iron-values.

It is another object of this invention to provide an improved method for extracting vanadium-values from vanadium-bearing iron ores and/or iron ore concentrates including mixing the iron ores and/or iron ore concentrates with a calcium containing material, roasting the mix in an atmosphere containing oxygen, comminuting the roasted mix and then leaching the comminuted mix in an aqueous solution containing ammonium carbonate or ammonium bicarbonate to thereby extract vanadium-values as ammonium vanadates which are alkali-free. The ammonium vanadates are soluble in the aqueous leaching solution but the calcium carbonate or calcium bicarbonate simultaneously produced during extraction is substantially insoluble in the aqueous leaching solution. The aqueous leaching solution can be easily treated to recover alkali-free vanadium-values.

Broadly, the method of the invention includes mixing vanadium-bearing iron ores and/or iron ore concentrates with a calcium containing material, roasting the mix at a temperature for a time in an atmosphere containing oxygen to form calcium vanadates, comminuting the roasted mix and leaching the roasted comminuted mix in an aqueous solution containing carbonate or bicarbonate compounds whereby vanadium-values in the form of vanadates are extracted from the roasted iron ores and/or iron ore concentrates.

PREFERRED EMBODIMENT OF THE INVENTION

Vanadium-values can be extracted from vanadium-bearing iron ores and/or iron ore concentrates in an improved method of roasting and leaching which does not require an alkali in the roasting step and which therefore does not add alkali to the undissolved residue containing iron values recovered in the method and which may not add alkali to the vanadium-values recovered in subsequent processing.

Run-of-the-mine iron ores do not commonly occur in relatively fine particle size. It has been found that iron ores should have a relatively fine particle size, for example, 100% of the particles pass a 65 mesh sieve and 70% pass a 325 mesh sieve for optimum extraction of vanadium-values. Therefore, the run-of-the-mine vanadium-bearing iron ores should be comminuted to a relatively fine particle size. Iron ore concentrates are produced from run-of-the-mine iron ores which have been comminuted prior to concentration, therefore they are already in a relatively fine particle size suitable for extracting the optimum amount of vanadium-values therefrom. Hereinafter, when ores are mentioned we mean iron ores and iron ore concentrates containing vanadium-values.

The vanadium-values in the ores are believed to be in the trivalent state and can be thought of as replacing or substituting for a portion of the trivalent iron normally in the ores. It is necessary to oxidize the trivalent vanadium to the pentavalent state and to react the pentavalent vanadium with an element which will form a compound that enables the vanadium-values to be leached from the ores.

We therefore mix the ores with a calcium containing material. The calcium containing material can be any one of the following materials: limestone, lime, hydrated or slaked lime, dolomite [$CaMg(CO_3)_2$] and the like. Limestone is defined as a naturally occurring mineral or fossil composed primarily of calcium carbonate ($CaCO_3$) with varying amounts of impurities and includes such materials as high calcium limestone, chalk, calcitic limestone, coral limestone, clam shells, coquina, dolomitic limestone, fluxstone, fossiliferous limestone and the like. High calcium limestone can be defined as limestone containing largely calcium carbonate and not much magnesium carbonate, usually about 2 to 5% and impurities. Chemical-grade limestone is a pure type of high calcium limestone containing a minimum of 95% total calcium carbonate content.

Lime ($CaO$) is a manufactured product produced by calcining limestone. During calcination, carbon dioxide gas is expelled leaving a residue of calcium oxide which is called quicklime. When water is added to lime the compound calcium hydroxide, generally called hydrated or slaked lime, is formed.

Dolomite is defined as a naturally occurring mineral containing calcium carbonate ($CaCO_3$) and magnesium carbonate ($MgCO_3$) and varying amounts of impurities.

It is preferred to use limestone or chemical grade limestone. The calcium containing material should be comminuted to a relatively fine particle size prior to mixing with the ores. It has been found that a particle size where, for example, 90% of the particles are −100 mesh sieve size is suitable for the instant method.

It is within the scope of the invention to process the ores and calcium containing material in the form of relatively fine particles, however, for convenience in handling the mixtures of the ore and calcium containing material during roasting, the mix is formed into green balls having a size, for example, three-eighth inch in diameter. It is well known that green balls of ores generally have poor green strength and that the green strength can be improved by the addition of a binder. Therefore, a binder such as bentonite can be added to the mix to improve the green strength of the green balls. The balled materials are charged into a furnace and are roasted at a temperature for a time in the presence of an atmosphere containing oxygen to oxidize a substantial portion, if not all, of the trivalent vanadium to the pentavalent state. The pentavalent vanadium reacts with the calcium in the mix to form calcium vanadates. The amount of the calcium containing material which is added to the ores should be in excess of the stoichiometric amount required to react with the pentavalent vanadium in the roasted ores. Any conventional furnace, for example, a rotary hearth furnace, a travelling grate, a shaft furnace, a rotary kiln and the like, can be used to roast the mix. Examples of atmospheres containing oxygen which can be used during roasting include atmospheres formed by burning fuel with excess air. Of course, the mix can be roasted in air to obtain the results of the invention. While minimal amounts of vanadium-values can be removed from the ores by roasting the mix at a temperature of about 2300° F., it is preferred to roast the mix within a temperature range to about 2350° to 2500° F. to obtain extractions of vanadium-values of about 30 to 80%. The maximum recovery of vanadium-values is obtained by roasting the mix within a temperature range of about 2400° to about 2450° F. Of course, it must be recognized that the extraction of vanadium-values is dependent to some extent upon the ore which is being treated. Vanadium-bearing iron ores which have varying compositions can be treated by the method herein described. However, somewhat different roasting temperatures for optimum recovery of vanadium-values may be required for some ores.

During roasting the green balls are hardened to form pellets. The pellets are removed from the furnace and are allowed to cool. The pellets are then comminuted to a relatively fine size so that, for example, 100% of the particles formed during comminution will pass a 325 mesh sieve prior to leaching. The roasted comminuted particles are leached in an aqueous solution containing carbonate or bicarbonate compounds, for example, ammonium carbonate, ammonium bicarbonate, potassium carbonate, potassium bicarbonate, sodium carbonate, sodium bicarbonate, and water sparged with $CO_2$ gas. Water sparged with $CO_2$ is the least efficient leaching medium. Sodium carbonate and sodium bicarbonate are less expensive than potassium carbonate and potassium bicarbonate and are, therefore, used more often than the potassium compounds. The use of any of the above alkali compounds adds an alkali to the vanadate-rich solution which is formed during leaching. As a result, the subsequent recovery of vanadium-values in a substantially alkali-free form is often difficult to accomplish. When either ammonium carbonate or ammonium bicarbonate is used to leach the vanadates from the roasted ores, there is no addition of an alkali to the vanadate-rich aqueous solution and hence the vanadium-rich aqueous solutions do not contain added alkali and therefore the recovery of the vanadium values in a substantially alkali-free form is easily accomplished. It is therefore preferred to use aqueous leaching solutions containing ammonium carbonate or ammonium bicarbonate to leach vanadates from the roasted ores. In the use of the above mentioned leaching media substantially no alkali is added to the undissolved residue containing iron-values which remains after leaching.

The leaching step produces a vanadate-rich aqueous solution and an undissolved residue containing iron-values which is the ore from which at least a major portion of the original vanadium-values have been extracted in the form of vanadates. During leaching, a reaction occurs between the calcium vanadates formed during roasting and the carbonate or bicarbonate compound contained in the aqueous leach solution. The reaction produces vanadates which are readily soluble in the aqueous leaching solution and thereby produce a vanadate-rich aqueous solution and calcium carbonate or calcium bicarbonate which is substantially insoluble in the aqueous leaching solution and which remains with the undissolved residue containing iron-values. The calcium vanadates which are formed during roasting are generally recognized as being insoluble or at least very slightly soluble in water. However, the calcium vanadates are sufficiently soluble so that a reaction can occur with the soluble carbonate or bicarbonate compound in the aqueous leaching solution to form readily soluble vanadates and substantially insoluble calcium carbonate or calcium bicarbonate. The latter substantially insoluble compound remains with the undissolved residue containing iron-values. It is practically impossible to remove all of the vanadium-values from the roasted ores but under optimum conditions it is possible to extract more than about 70% of the vanadium-values as vanadates. In order to obtain effective leaching of vanadium-values, for example, about 70% extraction from the original ore, it is necessary to have a sufficient amount of the leaching agent present in the aqueous solution. We have found that the concentration of the leaching agent in the aqueous solution is immaterial but the aqueous leaching solutions should contain an amount of carbonate or bicarbonate compound at least equal to and preferably in excess of the stoichiometric amount required to react with the calcium which is combined with the pentavalent vanadium in the roasted ores. Aqueous leaching solutions which contain as little as 0.25% and as much as 15% of the leaching agent can be used to obtain the results desired. We have also found that the extraction process is relatively insensitive to time or temperature and the reactions occur rapidly even at room temperature so long as sufficient carbonate or bicarbonate compound is present to react with the calcium vanadates.

After a time, the vanadate-rich solution which is formed during leaching is separated from the undissolved residue containing iron-values and which is depleted of vanadium-values and which now also contains calcium carbonate or bicarbonate. The vanadium-values of the vanadate-rich aqueous solution can be removed from the solution by known methods and can be recovered as a usable product. The roasted, ground and leached ores which remain as undissolved residue containing iron-values and calcium carbonate or bicarbonate can be reballed or can be sintered in preparation for the recovery of the iron-values therein. The inclusion of calcium compounds in the undissolved residues is helpful rather than harmful since the calcium compound is a flux which is normally used in the smelting of iron ores.

While sodium carbonate or bicarbonate solutions can be used as the aqueous leaching solution, we prefer to use ammonium carbonate or ammonium bicarbonate solutions. When using ammonium carbonate or ammonium bicarbonate as the aqueous leaching solution, ammonium vanadates which are readily soluble in the aqueous solution are formed. The vanadium-values in the ammonium vanadate-rich aqueous solution can be precipitated and directly recovered as an alkali-free usable product since no alkali has been added during the leaching step.

In these specifications and claims wherever percentages are referred to, such percentages are on a weight basis unless otherwise identified. Wherever sieve sizes are referred to, such sieve sizes are Tyler Sieve Series.

It must be understood that the roasted mix can be comminuted in either a dry condition immediately after roasting or in a wet condition in the presence of the aqueous leaching solution. Comminution of the roasted mix in the presence of the aqueous leaching solution combines the comminution and leaching steps into one step. Therefore, when we refer to comminution in these specifications and claims, we mean either one of the two methods described above. An example of known methods for precipitating vanadium values from aqueous solutions of vanadates is described in U.S. Pat. No. 2,697,650.

In a specific example of the invention, a limestone-iron ore concentrate mix made to a ratio of 200 pounds of limestone to a ton of concentrate was balled into green balls, each of which weighed about 3 grams. The iron ore concentrate had the following chemical composition:

| | |
|---|---|
| *Fe$^t$ | 64.4% |
| SiO$_2$ | 1.0% |
| Al$_2$O$_3$ | 2.9% |
| V | 0.54% |
| CaO | 0.19% |
| MgO | 0.78% |
| TiO$_2$ | 3.9% |
| S | 0.10% |
| Na$_2$O | 0.10% |

* total iron in concentrate.

Sieve analysis of the particles in the iron ore concentrate showed that 70% of the particles passed through a 325 mesh sieve. The limestone had the following composition:

| | |
|---|---|
| CaCO$_3$ | 97.0% |
| MgCO$_3$ | 1.1% |
| SiO$_2$ | 1.1% |
| S | .018% |
| Al$_2$O$_3$ | .50% |
| Fe$^t$ | .17% |

Sieve analysis of the limestone showed that 91% of the particles passed a 100 mesh sieve. Bentonite in a ratio of 12 pounds to a ton of concentrate was added to the limestone-concentrate mix to give good green and dry strength to the green balls. The green balls were charged into a pot grate furnace and were roasted at 2400° F. for about 1¼ hours in the presence of gases produced by burning natural gas in an excess of air to form an oxidizing atmosphere. The roasted pellets were removed from the furnace and were cooled to ambient temperature. The pellets were comminuted to a particle size of 100% −325 mesh sieve size. The roasted and comminuted particles were leached in a 15% aqueous solution of ammonium carbonate. The leached particles were separated from the aqueous solution by filtration. The leached undissolved residue particles were analyzed. The chemical analysis is shown below:

| | |
|---|---|
| *Fe$^t$ | 59.7% |
| V | 0.09% |
| CO$_2$ | 0.69% |
| Na$_2$O | 0.06% |
| CaO | 5.0% |

* total iron in the leached undissolved residue.

About 83% of the vanadium-values originally in the iron ore concentrate was extracted by the method of the invention. No alkali in the form of Na$_2$O was added to the concentrate.

In a second specific example of the invention 150 grams of an iron ore concentrate which had the following analysis:

| | |
|---|---|
| *Fe$^t$ | 68.9% |
| SiO$_2$ | 1.34% |
| Al$_2$O$_3$ | 0.25% |
| CaO | 0.25% |
| Na$_2$O | 0.06% |
| TiO$_2$ | 0.12% |
| V | 0.51% |

S 0.002%

* total iron in concentrate and a particle size of about 70% −325 mesh sieve size, was mixed with 15 grams of reagent grade calcium carbonate ($CaCO_3$) having a particle size of 100% −325 mesh sieve size. The mix was formed into green balls each of which weighed about 3 grams. (The mix was made to a ratio of 200 pounds of calcium carbonate to a ton of concentrate.) The green balls were heated in a muffle furnace in the presence of air to a temperature of 2400° F. and were held at heat for 1 hour. The pellets formed during roasting were removed from the furnace and were cooled to ambient temperature. The pellets were comminuted to a particle size of 100% −325 mesh sieve size.

A representative portion of the roasted comminuted particles was divided into equal lots of about 50 grams each. One lot was leached in 500 milliliters of a 15% aqueous solution of sodium carbonate. Particles of undissolved residue were separated from the aqueous solution by filtering. The undissolved residue was washed with water and was analyzed. The chemical analysis is shown below:

| | |
|---|---|
| *Fe$^t$ | 64.71% |
| V | 0.08% |
| $CO_2$ | 1.8% |
| $Na_2O$ | 0.08% |
| CaO | 5.0% |

* total iron in leached undissolved residue

About 83% of the vanadium-values originally in the iron ore concentrate was extracted by the method of the invention. A second lot of 50 grams of ground particles was leached with 200 milliliters of water containing 1.94 grams of reagent grade ammonium carbonate. The undissolved residue was separated from the aqueous solution by filtering. The undissolved residue was washed with water and was analyzed. The analysis follows:

| | |
|---|---|
| Fe$^t$ | 63.9% |
| V | 0.10% |
| $CO_2$ | 1.86% |
| $Na_2O$ | less than 0.05% |
| CaO | 5.1% |

About 79% of the vanadium-values in the original iron ore concentrate was extracted by the method of the invention.

The iron content (Fe$^t$) in the undissolved residue is less than in the original iron ore and/or iron ore concentrate treated because the undissolved residue now contains calcium compounds (reported as CaO) which are added as a result of the roasting and leaching treatment.

We claim:

1. An improved method for extracting vanadium-values from vanadium-bearing iron ores wherein said ores are comminuted to a relatively fine particle size and are roasted and leached to produce a vanadate-rich aqueous solution and an undissolved residue containing iron-values, without contaminating said undissolved residues with alkali, said method comprising:

a. mixing said comminuted vanadium-bearing iron ores and at least one calcium containing material taken from the group consisting of limestone, lime, hydrated lime and dolomite, b. charging the mix into a furnace, c. roasting the mix at a temperature for a time in an atmosphere containing oxygen to oxidize the vanadium-values therein and to form calcium vanadates, d. discharging the roasted mix from the furnace, e. cooling the roasted mix, f. comminuting the roasted mix, g. leaching the comminuted roasted mix in an aqueous solution of at least one material taken from the group consisting of sodium carbonate, sodium bicarbonate, potassium carbonate, potassium bicarbonate, ammonium carbonate, ammonium bicarbonate and water sparged with $CO_2$ gas for a time to react a substantial portion of the calcium vanadates with the leaching agent to form vanadates which are readily soluble in the aqueous solution to form a vanadate-rich aqueous solution and at least one calcium compound taken from the group consisting of calcium carbonate and calcium bicarbonate which is substantially insoluble in the aqueous solution and which remains in the undissolved residue containing iron-values, and h. separating the vanadate-rich aqueous solution from the undissolved residue containing iron-values.

2. The improved method of claim 1 wherein the calcium containing material in step (a) is limestone.

3. The improved method of claim 1 wherein the calcium containing material in step (a) is chemical-grade limestone.

4. The improved method of claim 2 wherein the limestone is added in a ratio of about 100 pounds to about 200 pounds per ton of the iron ores.

5. The improved method of claim 1 wherein the aqueous leaching solution of step (g) contains an amount of sodium carbonate sufficient to extract a major portion of the calcium vanadates formed during roasting.

6. The improved method of claim 5 wherein the aqueous leaching solution contains about 0.25 to about 15% sodium carbonate.

7. The improved method of claim 1 wherein the aqueous leaching solution of step (g) contains an amount of at least one compound taken from the group consisting of ammonium carbonate and ammonium bicarbonate sufficient to extract a major portion of the calcium vanadates formed during roasting.

8. The improved method of claim 7 wherein the aqueous leaching solution contains about 0.25 to about 15% ammonium carbonate.

9. The improved method of claim 1 wherein the mix of step (a) is balled prior to roasting.

10. An improved method for extracting vanadium-values from vanadium-bearing iron ore concentrates wherein said iron ore concentrates are roasted and leached to produce a vanadate-rich aqueous solution and an undissolved residue containing iron-values without contaminating said undissolved residues with alkali, said method comprising:

a. mixing comminuted particles of said iron ore concentrates with at least one calcium containing material taken from the group consisting of limestone, lime, hydrated lime, and dolomite, b. charging the mix into a furnace, c. roasting the mix at a temperature for a time in an atmosphere containing oxygen to oxidize the vanadium-values therein and to form calcium vanadates, d. discharging the roasted mix from the furnace, e. cooling the roasted mix, f. comminuting the roasted mix, g. leaching the comminuted roasted mix in an aqueous solution of at least one material taken from the group consisting of sodium carbonate, sodium bicarbonate, potassium carbonate, potassium bicarbonate, ammonium carbonate, ammonium bicarbonate, and water sparged with carbon dioxide gas for a time sufficient to react a substantial portion of the calcaium vanadates with the leaching agent to form vanadates which are readily soluble in the aqueous solution to form a vanadate-rich aqueous solution and at least one calcium compound taken from the group consisting of calcium carbonate and calcium bicarbonate which is substantially insoluble in the aqueous solution and which remains in the undissolved residue containing iron-values, and h. separating the undissolved residue containing iron-values from the vanadate-rich aqueous solution.

11. The improved method of claim 10 wherein the calcium containing material in step (a) is limestone.

12. The improved method of claim 10 wherein the calcium containing material in step (a) is chemical-grade limestone.

13. The improved method of claim 11 wherein the limestone is added in step (a) in a ratio of about 100 pounds to about 200 pounds per ton of the iron ores and iron ore concentrates.

14. The improved method of claim 10 wherein the aqueous leaching solution of step (g) contains sodium carbonate.

15. The improved method of claim 10 wherein the aqueous leaching solution of step (g) is ammonium carbonate.

16. The improved method of claim 14 wherein the aqueous leaching solution contains about 0.25 to about 15% sodium carbonate.

17. The improved method of claim 15 wherein the aqueous leaching solution contains about 0.25 to about 15% ammonium carbonate.

18. The improved method of claim 10 wherein the mix of step (a) is roasted at a temperature within the range of about 2300° to about 2500° F.

19. The improved method of claim 10 wherein the mix of step (a) is roasted within a temperature range of about 2350° to about 2450° F.

20. The improved method of claim 10 wherein the mix of step (a) is formed into green balls prior to roasting.

21. An improved method for extracting vanadium-values from vanadium-bearing iron ores wherein said ores are comminuted to a relatively fine particle size and are roasted and leached to produce a vanadate-rich aqueous solution and an undissolved residue containing iron-values, and wherein said vanadates which are recovered from said vanadate-rich aqueous solution and said undissolved residue containing iron-values are alkali-free, said method comprising:

a. forming a mix of said comminuted vanadium-bearing iron ores and at least one calcium containing material taken from the group consisting of limestone, lime, hydrated lime and dolomite, b. charging said mix into a furnace, c. roasting said mix at a temperature for a time in an atmosphere containing oxygen to oxidize the vanadium-values in said vanadium-bearing iron ores and to form calcium vanadates therefrom, d. discharging the roasted mix from the furnace, e. cooling the roasted mix, f. comminuting the cooled roasted mix, g. leaching the comminuted cooled mix in an aqueous solution containing at least one compound taken from the group consisting of ammonium carbonate and ammonium bicarbonate for a time to react a substantial portion of said calcium vanadates with said ammonium carbonate and said ammonium bicarbonate to form ammonium vanadates which are readily soluble in said aqueous leaching solution to form a vanadate-rich aqueous solution and at least one calcium compound taken from the group consisting of calcium carbonate and calcium bicarbonate which is substantially insoluble in said aqueous leaching solution and which remains in said undissolved residue containing iron-values, and h. separating said vanadate-rich aqueous leaching solution from said undissolved residue containing iron-values.

22. The improved method of claim 21 wherein the calcium containing material in step (a) is limestone.

23. The improved method of claim 21 wherein the calcium containing material in step (a) is chemical-grade limestone.

24. The improved method of claim 22 wherein the limestone is added in a ratio of about 100 pounds to about 200 pounds per ton of the iron ores.

25. The improved method of claim 21 wherein the aqueous solution of step (g) is ammonium carbonate.

26. The improved method of claim 25 wherein the aqueous solution contains about 0.25 to about 15% ammonium carbonate.

27. The improved method of claim 21 wherein the mix of step (a) is formed into green balls prior to roasting.

28. An improved method for extracting vanadium-values from vanadium-bearing iron ores and iron ore concentrates and admixtures thereof, wherein said iron ores and iron ore concentrates have a relatively fine particle size and are roasted and leached to produce an aqueous solution containing readily soluble vanadates and a substantially insoluble residue containing iron-values low in alkali, said method comprising:

a. mixing said relatively fine particles of said iron ores and iron ore concentrates and limestone in a weight ratio of about one ton of said iron ores and iron ore concentrates to about 100 pounds to about 200 pounds of limestone, b. balling the mix, c. charging the balled mix into a furnace, d. roasting the balled mix within a temperature range of about 2300° to about 2500° F. for a time in an atmosphere containing oxygen to oxidize the vanadium-values therein and to form calcium vanadates, e. discharging the roasted balled mix from the furnace, f. cooling the roasted balled mix,
g. comminuting the cooled balled mix,
h. leaching the comminuted particles of the mix in an aqueous solution containing about 0.25 to about 15% of at least one compound taken from the group consisting of sodium carbonate, potassium carbonate, sodium bicarbonate, potassium bicarbonate, ammonium carbonate, and ammonium bicarbonate, for a time to react a substantial portion of said calcium vanadates with the carbonate or bicarbonate compound in the leaching solution to form vanadates which are readily soluble in the aqueous leaching solution to form a vanadate-rich aqueous solution and at least one compound taken from the group consisting of calcium carbonate and calcium bicarbonate which is substantially insoluble in the aqueous solution and which remains as part of the undissolved residue containing iron-values, and
i. separating the vanadate-rich solution from the undissolved residue containing iron-values.

29. The improved method of claim 28 wherein the calcium containing compound in step (a) is limestone.

30. The improved method of claim 28 wherein the limestone in step (a) is chemical-grade limestone.

31. The improved method of claim 28 wherein the aqueous solution in step (h) contains sodium carbonate.

32. The improved method of claim 28 wherein the aqueous solution in step (h) contains ammonium carbonate.

* * * * *